Figure 1:
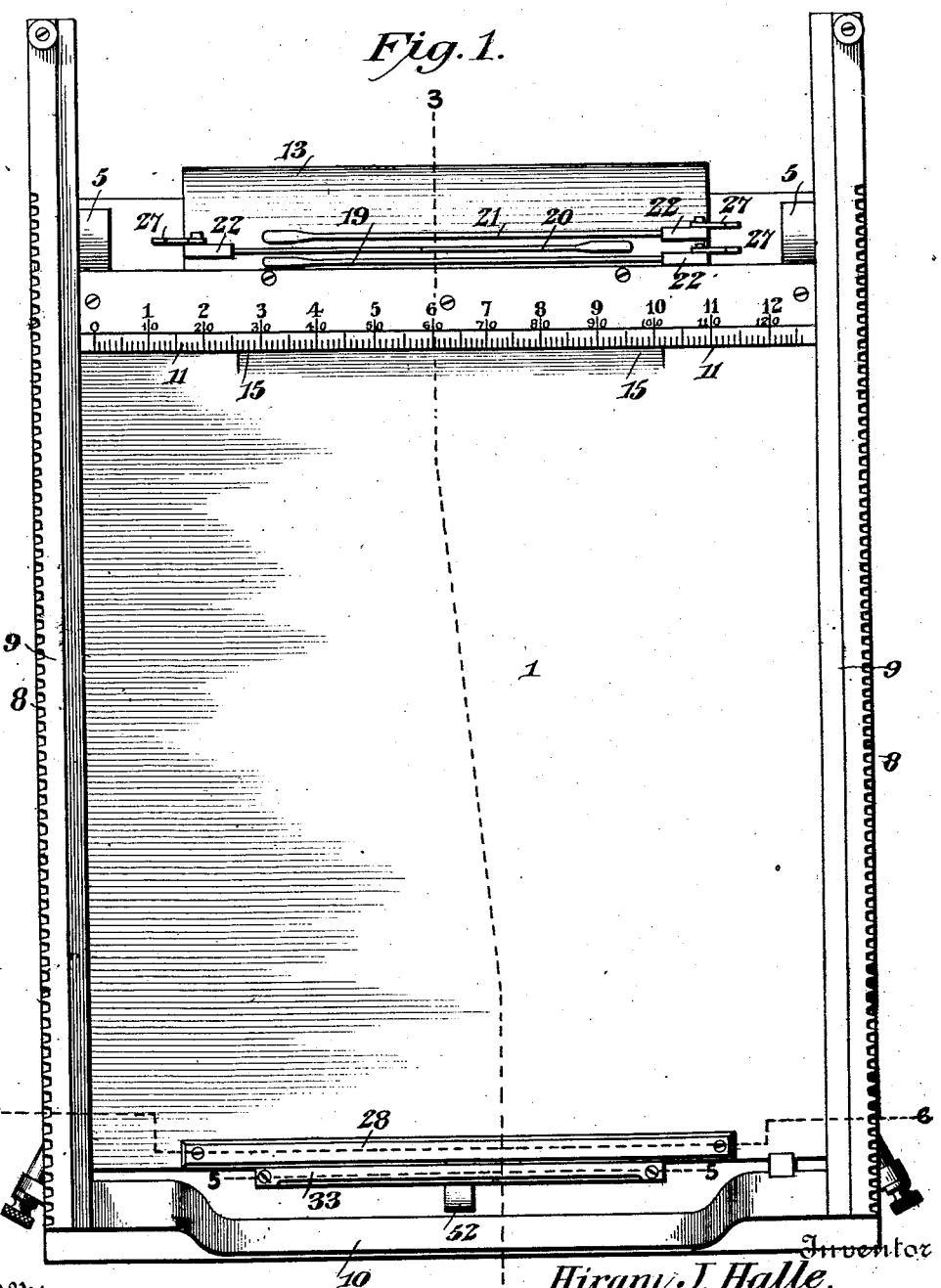

No. 843,012. PATENTED FEB. 5, 1907.
H. J. HALLE.
MANIFOLDING MEANS FOR FLAT PLATEN TYPE WRITERS.
APPLICATION FILED JAN. 4, 1906.

8 SHEETS—SHEET 1.

Witnesses
Jas. K. McCathran
Louis G. Julihn

Inventor
Hiram J. Halle,
By C. G. Siggers
Attorney

No. 843,012. PATENTED FEB. 5, 1907.
H. J. HALLE.
MANIFOLDING MEANS FOR FLAT PLATEN TYPE WRITERS.
APPLICATION FILED JAN. 4, 1906.

8 SHEETS—SHEET 3.

Witnesses

Hiram J. Halle, Inventor

By

Attorney

No. 843,012. PATENTED FEB. 5, 1907.
H. J. HALLE.
MANIFOLDING MEANS FOR FLAT PLATEN TYPE WRITERS.
APPLICATION FILED JAN. 4, 1906.
8 SHEETS—SHEET 4.
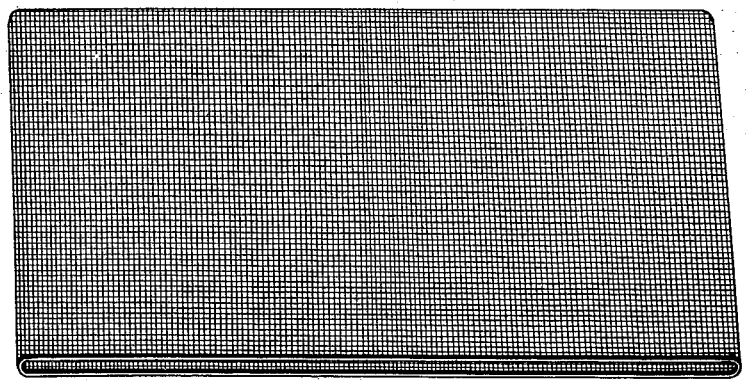
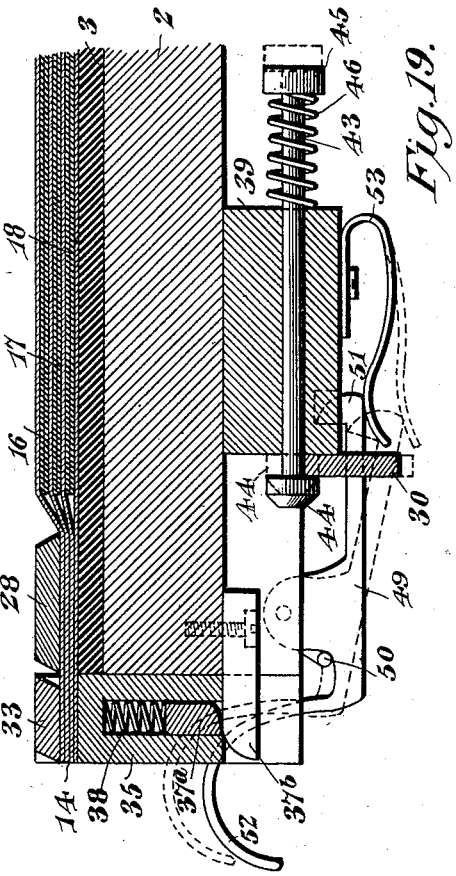
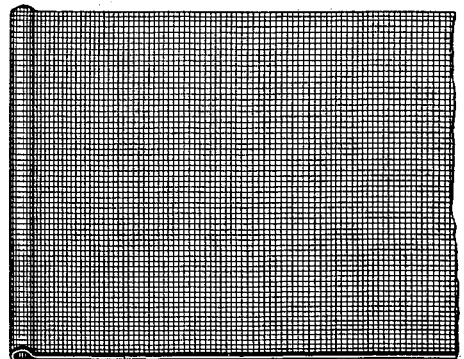
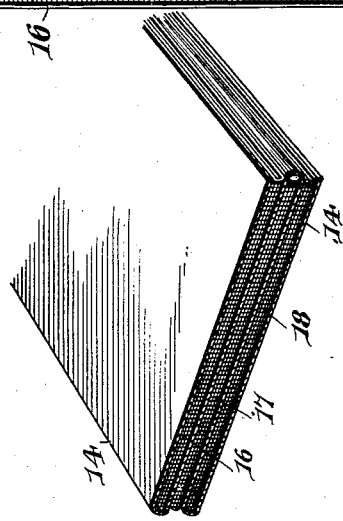
Hiram J. Halle, Inventor
By C. G. Siggers
Attorney
Witnesses

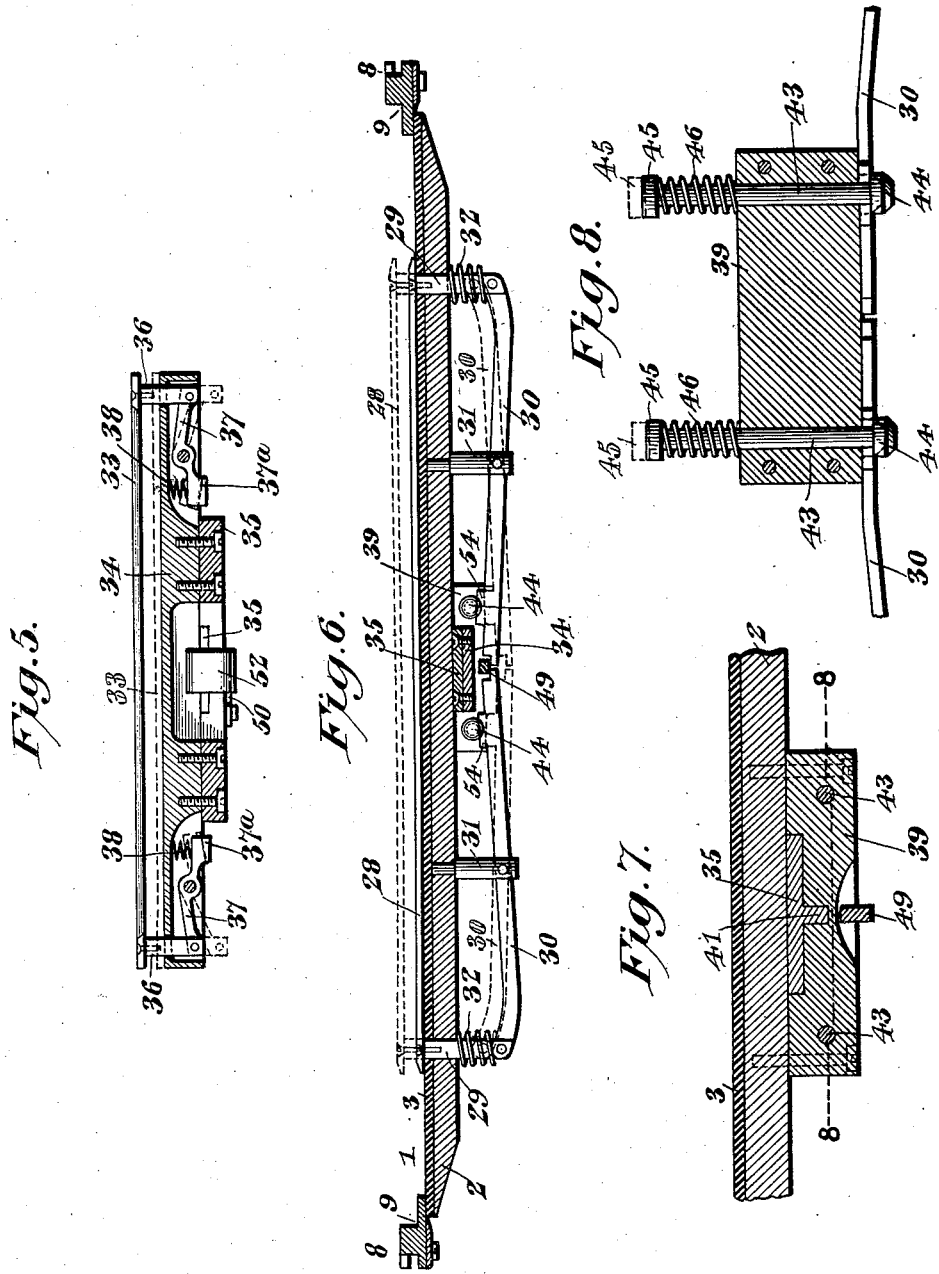

No. 843,012. PATENTED FEB. 5, 1907.
H. J. HALLE.
MANIFOLDING MEANS FOR FLAT PLATEN TYPE WRITERS.
APPLICATION FILED JAN. 4, 1906.
8 SHEETS—SHEET 6.
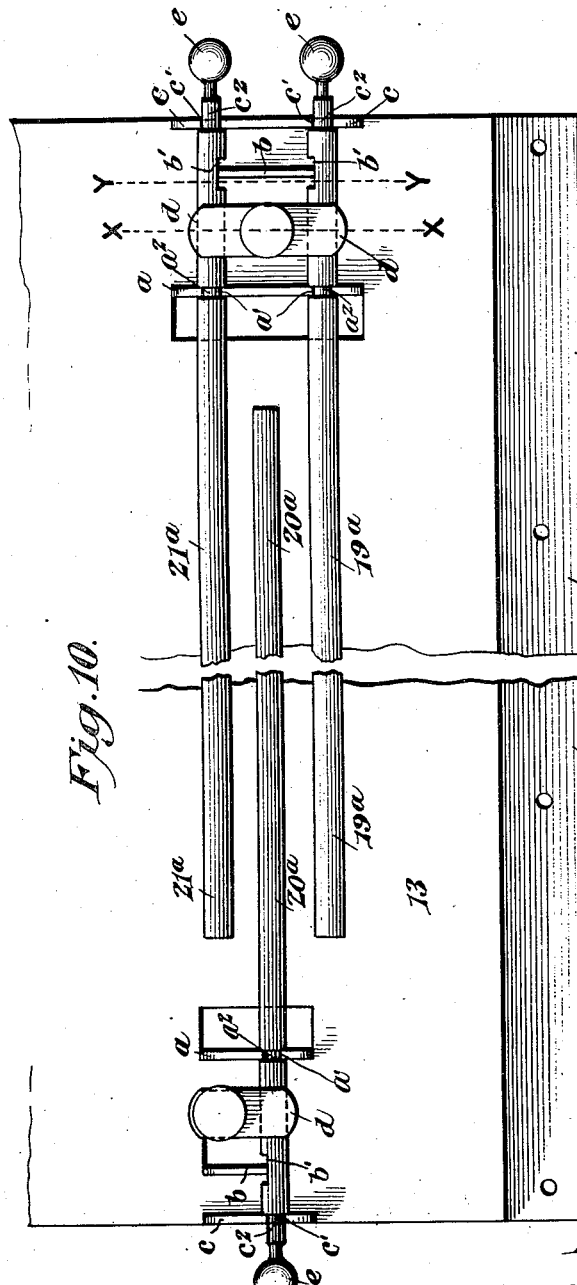
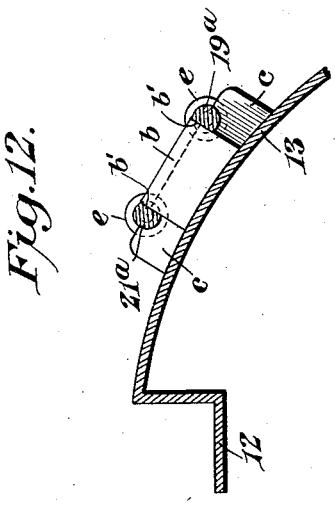
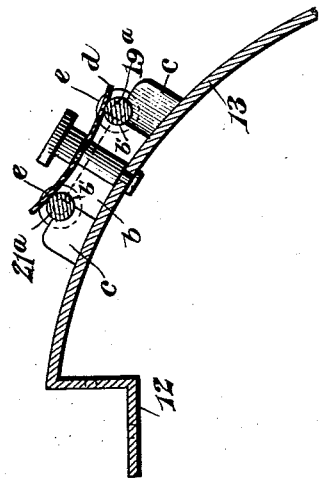
Witnesses
Jas. F. McCathran
Louis G. Julihn
Hiram J. Halle, Inventor
By E. G. Siggers
Attorney

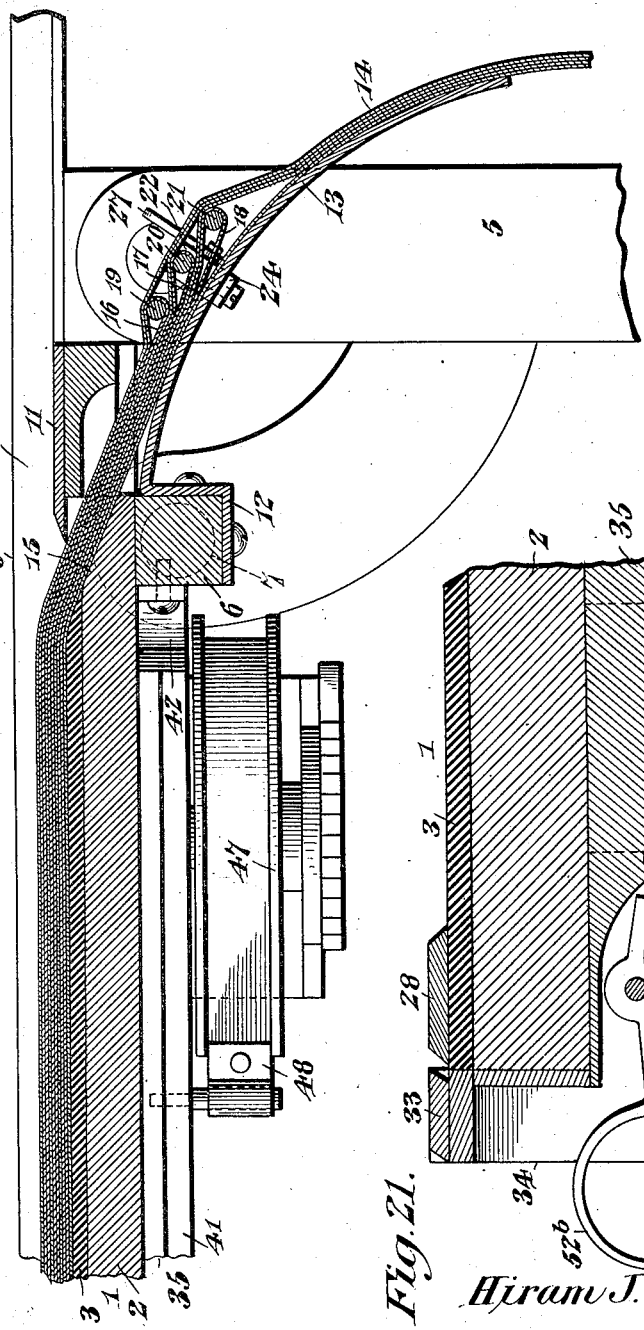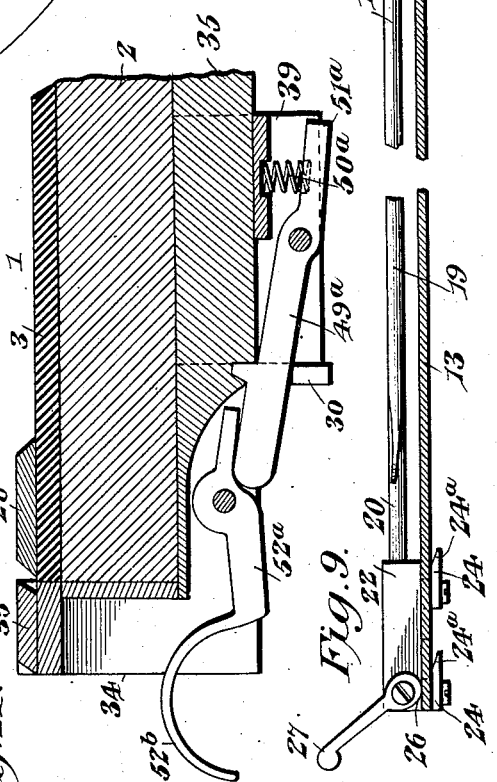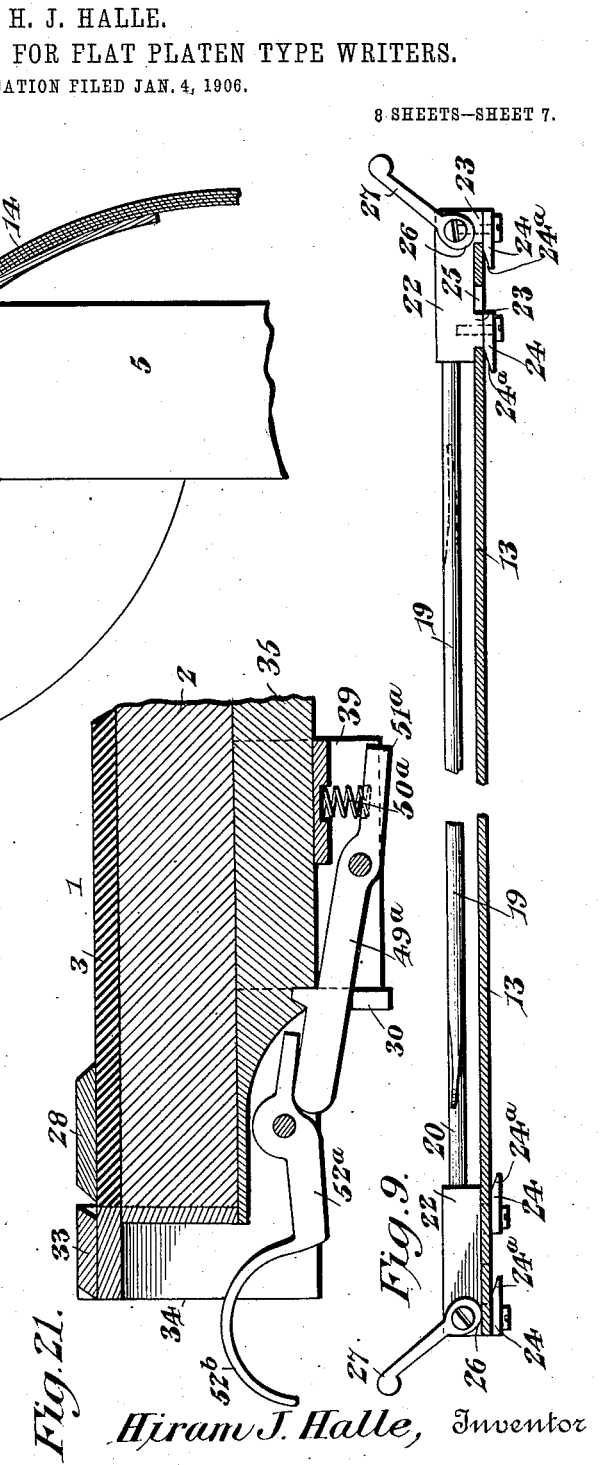

No. 843,012. PATENTED FEB. 5, 1907.
H. J. HALLE.
MANIFOLDING MEANS FOR FLAT PLATEN TYPE WRITERS.
APPLICATION FILED JAN. 4, 1906.
8 SHEETS—SHEET 8.
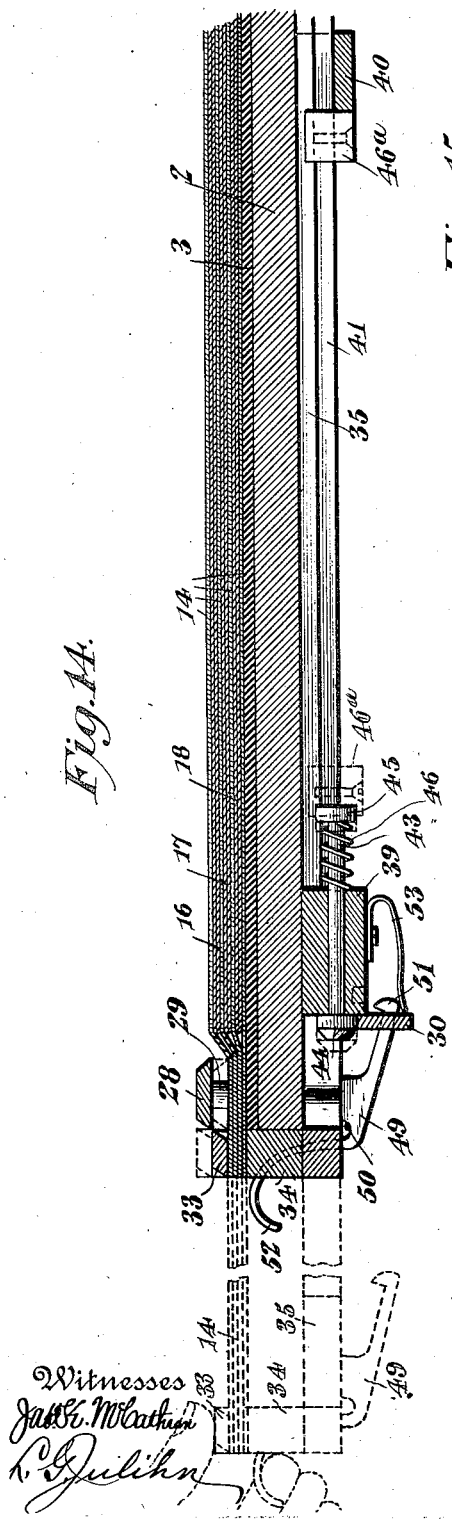
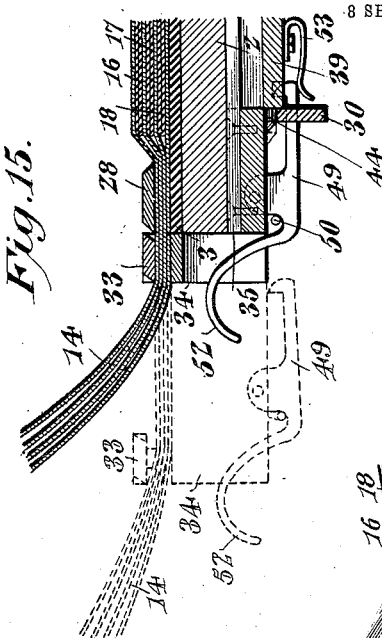
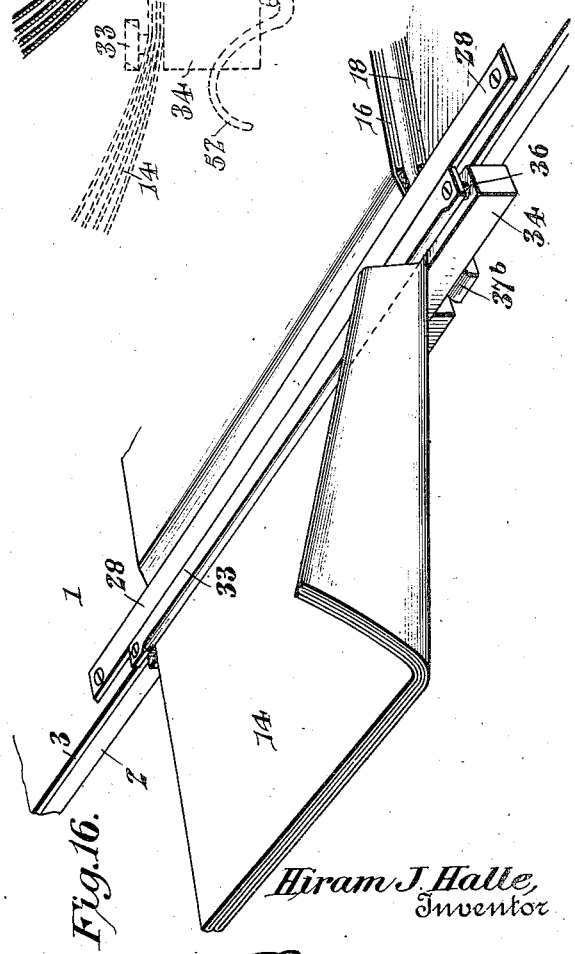
Hiram J. Halle,
Inventor
Witnesses

UNITED STATES PATENT OFFICE.

HIRAM J. HALLE, OF NEW YORK, N. Y., ASSIGNOR TO ELLIOTT-FISHER COMPANY, OF NEW YORK, N. Y., A CORPORATION OF DELAWARE.

MANIFOLDING MEANS FOR FLAT-PLATEN TYPE-WRITERS.

No. 843,012.   Specification of Letters Patent.   Patented Feb. 5, 1907.

Application filed January 4, 1906. Serial No. 294,658.

*To all whom it may concern:*

Be it known that I, HIRAM J. HALLE, a citizen of the United States, residing at New York, in the county of New York and State of New York, have invented a new and useful Manifolding Means for Flat-Platen Type-Writers, of which the following is a specification.

This invention relates to type-writing machines, and more especially to mechanism adapted for use in connection with flat-platen type-writers to facilitate the production of extensive manifold-records.

The object of the invention is to equip a type-writer, particularly one including a stationary flat platen, with means facilitating manifolding by the use of a plurality of long paper strips, webs, or sheets or by the use of a long manifold-strip comprising a plurality of sheets, webs, layers, or plies connected by a fold or folds extending longitudinally of the strip.

To the accomplishment of this object the preferred embodiment of the invention embraces means for guiding the paper over the platen, means for retaining one or more transfer elements between the paper sheets or layers, means for feeding the paper independently of the transfer means to displace the printed portion thereof from the platen, and means for severing the displaced portion of the paper.

The invention also embraces a platen-clamp and a feed-clamp. The platen-clamp is arranged to normally clamp the paper securely upon the platen and is automatically operated to release the paper during the feeding operation and to reclamp the paper for the purpose of preventing accidental displacement thereof during the retraction of the feeding mechanism. The feed-clamp is arranged to secure the paper to the feeding mechanism during the feeding operation and to permit the retraction of said feeding mechanism independently of the paper.

Other objects of the invention and additional structural features thereof will appear more fully during the course of the succeeding description of the illustrated structure.

Figure 2:
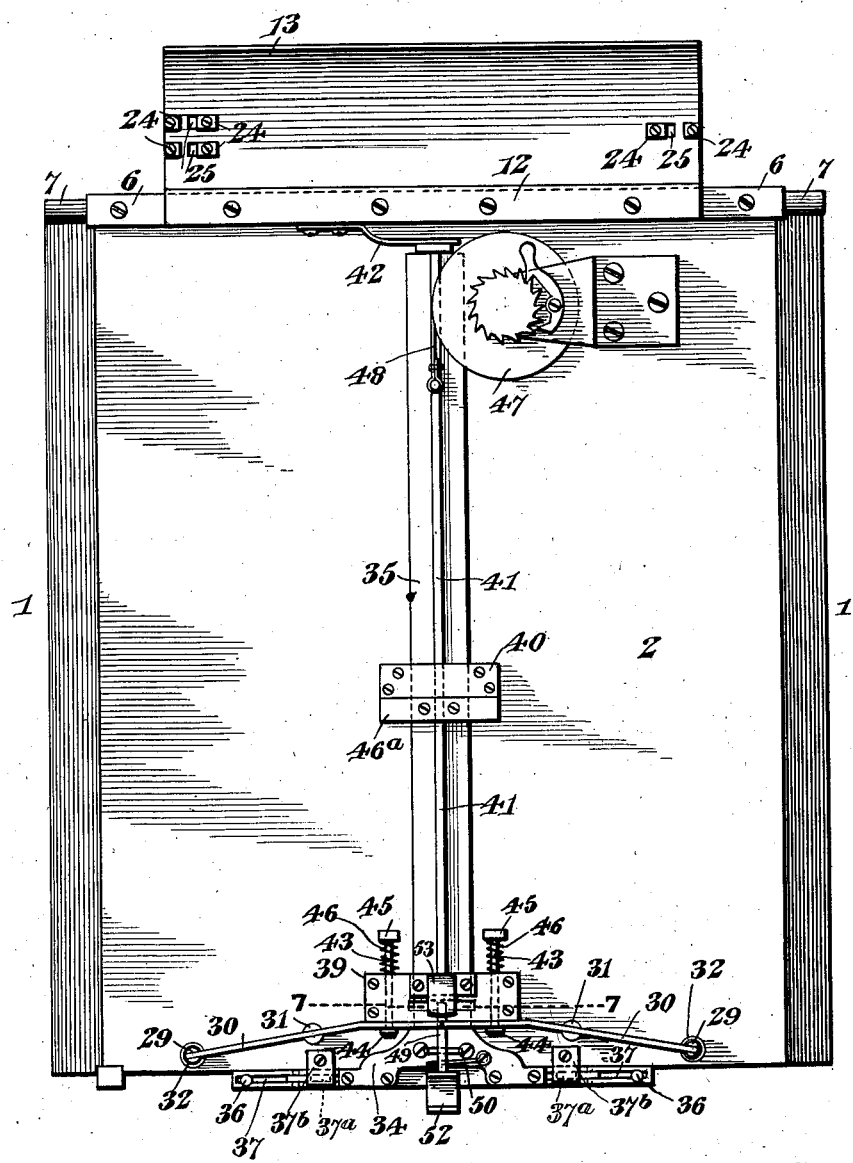
Figure 3:
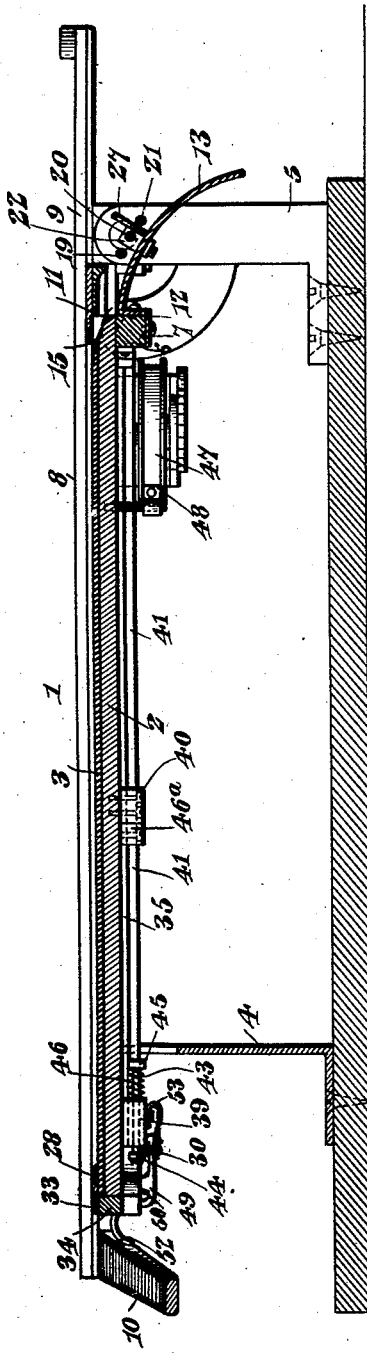
Figure 17:
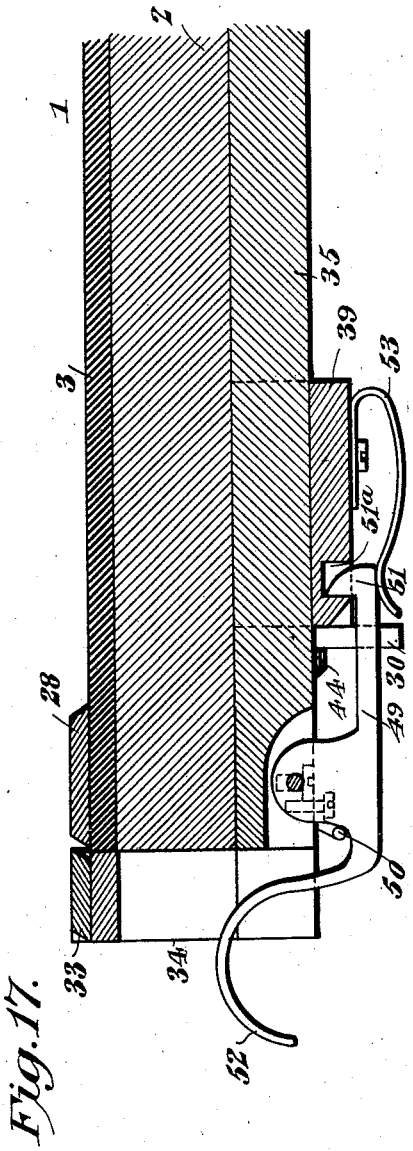

In the accompanying drawings, Figure 1 is a plan view of a platen equipped in accordance with my invention. Fig. 2 is an inverted plan of the platen. Fig. 3 is a longitudinal section on the line 3 3 of Fig. 1. Fig. 4 is an enlarged sectional view of the front end of the platen and its equipment, showing the positions normally assumed by the disclosed parts. Fig. 5 is a sectional view of the front end of the feed-slide, taken on the line 5 5 of Fig. 1, the normal position of the feed-clamp being indicated in dotted lines. Fig. 6 is a transverse section on the line 6 6 of Fig. 1, the elevated position of the platen-clamp being indicated in dotted lines. Fig. 7 is a section on the line 7 7 of Fig. 2. Fig. 8 is a section on the line 8 8 of Fig. 7, showing in full lines the normal relation of the buffer-rods and the clamp-operating levers and indicating in dotted lines the positions assumed by these parts when the plunger-rods have been operated to release the platen-clamp. Fig. 9 is a sectional elevation showing the manner of attaching the carbon-holders to the paper-guide. Fig. 10 is a plan view of a paper-guide equipped with carbon-holders secured by a modified form of retaining means. Fig. 11 is a sectional view on the line $x$ $x$ of Fig. 10. Fig. 12 is a similar view on the line $y$ $y$ of Fig. 10. Fig. 13 is a sectional view of the rear end of the platen equipped in accordance with the invention. Fig. 14 is a corresponding view of the front end of the platen, the parts being disposed in the positions assumed by them when the latch has been operated to release the feed-slide and to effect the elevation of the platen to release the paper, the positions assumed by the parts at the termination of the paper-feed being indicated in dotted lines. Fig. 15 is a sectional view of the front end of the platen, showing the positions assumed by the parts upon the return of the feed-slide to normal position and prior to the severance of the printed portion of the paper, the positions assumed by the feed-clamp, paper, and feed-slide during the retraction of the latter being indicated in dotted lines. Fig. 16 is a perspective view of the front end of the platen, showing the advanced portion of the manifold-strip in the act of being severed. Fig. 17 is a sectional view of a portion of the platen and slide designed more particularly to show the catch and its relation to the platen clamp-levers. Fig. 18 is a detail view of one of the endless transfer elements or carbons. Fig. 19 is a detail view of a modified form of transfer element. Fig. 20 is a detail view in perspective, showing the transfer elements or carbons interposed between the sheets or layers of the manifold-strip; and Fig. 21 is a sectional view of the front end of the platen equipped with a modified form of latch for the feed-slide.

The stationary flat platen 1 illustrated in the drawings is of the kind ordinarily employed as an adjunct of the Elliott-Fisher type-writer of commerce exemplified in Patent No. 620,125, issued to Hatch and Hillard February 28, 1899. This platen may and preferably does comprise a metal base 2, having a hard-rubber or other suitable writing surface 3, Fig. 3, and is suitably carried by front and rear supports 4 and 5, the character of which, so far as the present invention is concerned, is not material, although the platen is preferably hinged to the rear supports 5, for which reason it is provided at its rear end with a rigid transverse bar 6, Fig. 2, having trunnions 7 extended into the rear platen-supports. This character of mounting enables the platen to be swung vertically, which is desirable when the machine is employed for writing in books. Also hinged to the platen-supports 5, but in rear of the hinged connection of the platen, is the usual machine-supporting frame 8, comprising tracks or guides 9, overlying the opposite side edges of the platen and connected by a front frame-bar 10, located in advance of the platen 1, and by a scale-bar 11, extending across the rear edge of the platen. (See Fig. 1.) The frame 8 supports the type-writing machine proper in a manner well understood in the art, said machine including downwardly-acting printing mechanism movable longitudinally and transversely of the platen for line and letter spacing.

Screwed or otherwise secured to the bar 6 is an angular flange 12, extending across the front end of an arcuate sheet-metal paper-guide 13, extending rearwardly and downwardly from the rear end of the platen, as illustrated in Figs. 2, 3, and 13. The paper, which in the illustrated embodiment of the invention is in the form of a manifold-strip 14, is led upwardly over the guide 13 from a suitable source of supply and is carried under the scale-bar 11 and over the writing-surface of the platen, Fig. 13, the latter being preferably formed with a depression 15 at its rear end to accommodate the strip. (See Figs. 1 and 13.)

Interposed between the sheets or layers of the manifold-strip 14 are transfer elements or carbons 16, 17, and 18, Figs. 13 and 14, which may be and preferably are of endless form and extend forwardly from carbon-holders 19, 20, and 21. The transfer elements shown are in the form of endless belts or webs of carbonized paper or any other suitable transfer material and extend loosely or "float" from the holders. The carbon-holders 19, 20, and 21 are in the form of bars preferably detachably carried by the paper-guide 13 and disposed in parallel relation, Figs. 1, 9, and 13. These bars or holders extend alternately in opposite directions, as shown in Fig. 1, in order to facilitate their insertion in opposite folds of the manifold sheet or strip 14.

At its outer end each carbon-holding bar is provided with a supporting-block 22, Fig. 9, which rests upon the outer surface of the guide 13 and is provided with a pair of depending lugs 23, to the under sides of which are secured retaining-plates 24, extended somewhat in advance of the lugs 23. The guide-plate 13 is provided with a pair of slots or openings 25 of sufficient size to permit the plates 24 to be passed downwardly through the paper-guide. When the plates 24 have been passed through the openings in the guide 13, the supporting-block is moved inward to present the extended ends of the plates 24 under the guide and out of coincidence with the openings 25, the upper surfaces of the extended ends of the plates 24 being preferably beveled, as indicated at 24$^a$, so that when the block 22 is moved in the manner stated the guide will be wedged securely between the block and the retaining-plates. (See Fig. 9.) In this position the block 22 is secured by a locking device, preferably in the form of a locking-cam 26, pivotally mounted on the block and arranged when operated by a handle 27 to engage the upper surface of the guide 13 in a manner to securely wedge the guide between the cam 26 and the retaining-plates 24. This arrangement of the carbon-holders enables them, together with the carbons carried thereby, to be easily slipped to place within the opposite folds of the strip 14 and to be quickly secured at their outer ends to the guide 13 in a manner to insure their rigid retention.

At the front end of the platen the paper is held securely by what may be termed a "platen-clamp" 28, (see Figs. 1, 4, and 6,) provided at its opposite ends with a pair of cylindrical stems 29, passed downwardly through the platen and pivotally connected at their lower extremities to the outer ends of a pair of clamp-levers 30, fulcrumed in hangers 31, depending from the under side of the platen, Fig. 6.

The clamp 28 is normally held in its active or depressed portion by springs 32, encircling the stems 29 and bearing at their opposite ends against the platen and the levers 30, respectively. In advance of the platen-clamp 28 is a feed-clamp or grip-plate 33, disposed above the elevated front end or abutment-block 34 of a feed-slide 35. (See Figs. 1, 4, 5, 14, and 15.) The block 34 normally rests against the front end of the platen, as shown in Fig. 4, and its upper edge is substantially flush with the writing-surface of the platen.

At the opposite ends of the clamp or grip plate 33 are provided a pair of stems 36, Fig.

5, passed downwardly through openings in the block 34 and pivotally connected to levers 37, fulcrumed in the block, and urged by springs 38 to elevate the clamp or grip plate 33 to its raised or inactive position. When the feed-clamp 33 is in its elevated position, (shown in Fig. 5,) which position it assumes during the retraction of said slide, the inner ends 37ª of the levers 37 project below the abutment-block 34, and just before the slide reaches the limit of its retractile movement these downwardly-projected ends of the levers engage fixed cams 37ᵇ, which are carried by the platen, and cause the levers 37 to swing against the resistance of the springs 38 for the purpose of restoring the feed-clamp 33 to its normal depressed position as the feed-slide reaches the limit of its movement. (See Fig. 4.)

The feed-slide 35 is opposed to the under side of the platen, as shown in Figs. 2 and 3, and is guided by a pair of stationary guide-blocks 39 and 40, screwed or otherwise secured to the under side of the platen and recessed to receive the slide 35 and a rib 41, extending longitudinally of the slide 35 to stiffen the same and assist in the guiding thereof. (See Fig. 7.) The retractile movement of the feed-slide is cushioned by a spring-buffer 42, Fig. 2, secured to the bar 6. Extended through the front guide-block 39 are a pair of buffer-rods 43, provided with front and rear heads 44 and 45, (see Figs. 2, 3, 4, 6, 8, and 14,) the latter being opposed to the rear ends of buffer-springs 46, encircling the rods 43 and having their rear ends opposed to the rear side of the block 39.

Disposed to coöperate with the buffer-rods 43 is a buffer-block 46ª, fixed to the feed-slide, as shown in Fig. 2, and normally resting against the guide-block 40. The feed-slide 35 is designed to be manually advanced against the resistance opposed to such advance by a spring-drum 47, connected to the slide 35 by a tape 48 and designed to effect the automatic retraction of the slide when the latter is released. (See Figs. 2, 3, and 13.) The feed-slide 35 is normally locked in its retracted position by a catch 49, (see Fig. 17,) pivoted at the under side of the front end of the feed-slide 35 and urged by a spring 50 to cause the beak 51 of the catch to engage a notch 51ª in the under side of the guide-block 39. Coöperatively related to the catch 49 and preferably integral therewith is a finger-piece 52, disposed below the clamp 33 in order that the operator may simultaneously depress the clamp 33 and operate the catch to release the slide by the mere act of gripping the slide preparatory to advancing the latter, as indicated in dotted lines in Fig. 14. A leaf-spring 53, mounted on the block 39 and extended over the notch 51ª, coöperates with the rear end of the catch 49 and augments the action of the spring 50 to insure the engagement of the catch with the block 39 when the feed-slide is retracted.

By reference to Fig. 6 it will be seen that the inner ends of the clamp-levers 30 extend under the catch 49 and that lugs or projections 54, formed on the levers 30, normally extend behind the front heads 44 of the buffer-rods 43. (See also Figs. 2, 4, and 8.) Thus it will be seen that normally the feed-slide occupies a retracted position and that both the platen-clamp 28 and the grip-plate 33 are depressed or closed. (See Fig. 4.)

*The operation of the device in brief.*—The record is type-written on the top layer or sheet of the manifold-strip in the usual manner and is transferred to the underlying record sheets or layers by the interposed transfer elements or carbons. When a record has been completed and it is desired to withdraw the printed portion of the manifold-strip from the printing area of the platen, the operator grips the front end of the feed-slide by placing the thumb on the feed-clamp 33 and the forefinger under the finger-piece 52 of the latch. This act of gripping the slide effects the performance of several functions: First, it causes the retention of the feed-clamp 33 in clamping engagement with the paper; second, it causes the release of the feed-slide by the withdrawal of the catch 49, and, third, it causes the release of the paper by the platen-clamp 28, for the reason that the downward movement of the rear end of the catch 49 depresses the inner ends of the levers 30, as shown in dotted lines in Fig. 6, and thus elevates the clamp 28 against the resistance of the springs 32. The several parts referred to will then occupy the positions indicated in Fig. 14. It will be noted, furthermore, that the described movement of the levers 30 will effect their withdrawal from behind the heads 44 of the buffer-rods 43, thereby permitting said rods to move rearwardly under the impulse of the springs 46 until the heads 44 are presented against the front side of the block 39. (See Figs. 8 and 14.) This will present the heads 44 of the buffer-rods directly above and in the paths of the lugs 54 on the levers 30 to hold the clamp 28 open. The operator now draws the feed-slide forward, as shown in dotted lines in Fig. 14, to advance the manifold-strip independently of the carbons for the purpose of displacing the printed portion of the paper from the printing area of the platen.

As the feed-slide reaches the limit of its forward or outward movement the buffer-block 46 strikes the rear heads 45 of the buffer-rods, urging the latter forwardly against the resistance of the springs 46, and thus removing the front heads 44 of the buffer-rods from over the inner ends of the levers 30, (see dotted positions of the parts indicated in Figs. 8 and 14,) allowing the levers 30 to assume their normal positions (shown in Fig. 6) and causing the platen-clamp 28 to move down upon the paper. The printed portion of the paper having been displaced from the platen and the platen-clamp having been automatically operated to clamp the paper at the front end of the platen, the operator releases the feed-slide. This act permits the feed-clamp 38 to release the paper and the spring-drum to retract the slide independently of the paper. (See the positions indicated in dotted lines in Fig. 15.)

Just before the feed-slide reaches the limit of its retractile movement the inner ends $37^a$ of the levers 37 will engage the fixed cams $37^b$ and will ride over the latter to cause the feed-clamp 33 to again clamp the paper as the feed-slide reaches the limit of its movement. At the same time the catch 49 will engage the block 39 and will overlie the inner ends of the levers 30, as shown in Fig. 17. The elements of the platen equipment will now be in their normal positions, but the printed portion of the paper will extend beyond the cutting edge of the feed-clamp, as shown in Fig. 15. The operator now completes the operation by drawing the extended portion of the paper against the cutting edge of the feed-clamp, as shown in Fig. 16, to sever the printed record and the duplicates thereof, all of which will be connected along opposite folds if the work element is in the form of a manifold-strip.

It will now be observed that a complete operation of the platen equipment to effect the feeding of the paper and the restoration of the parts to their normal positions contemplates the performance of the following functions: First, the act of gripping the feed-slide effects the release of the latter and also the release of the paper by the operation of the catch and platen-clamp, respectively; second, the same act causes the presentation of stops—to wit, the front heads of the buffer-plungers—in position to hold the platen-clamp open; third, the paper released from the platen but clamped to the feed-slide is drawn forward with the slide; fourth, the stops are restored to their normal positions and the platen-clamp being thus released is automatically restored to its normal position to clamp the paper to the platen; fifth, the slide is released, which act results in the opening of the feed-clamp and the retraction of the feed-slide independently of the paper, and, sixth, the feed-clamp is automatically depressed to clamp the paper as the slide comes to rest, thus facilitating the tearing or cutting of the paper.

While the structure disclosed has been specially devised for the purpose of employing a manifold-strip of the character shown for the production of a record and one or more duplicates thereof, the platen equipment is equally well adapted for securing manifold-records upon two or more disconnected sheets or webs arranged one above another in alternation with one or more carbon elements. It is to be understood, furthermore, that while carbon elements of the endless form shown in Figs. 14 and 15 (read conjointly) and also in Fig. 19 are perhaps preferable the use of single sheets of carbon or other suitable transfer material is contemplated, such sheets being attached to the carbon-holding bars in any suitable manner—as, for instance, by looping the end of the carbon around the bar, as shown in Fig. 20. In either event the carbon will extend forwardly from a carbon-holder or carbon-holders by which it will be held stationary during the independent advance of the paper. Furthermore, while the illustrated construction of the platen equipment is thought at this time to be preferable many structural variations may be effected within the scope of the invention. For instance, in Figs. 10, 11, and 12 of the drawings is shown a proposed variation of the mountings for the carbon-holders, and in Fig. 21 is shown a proposed variation of the feed-slide catch. In the figures first mentioned the paper-guide 13 is provided adjacent to each side thereof with three outstanding flanges $a$, $b$, and $c$ and with a turn-button $d$. The flanges $a$ and $c$ are provided with depressions or seats $a'$ and $c'$ for the reception of reduced portions $a^2$ and $c^2$ of the carbon-holding bars $19^a$, $20^a$, and $21^a$. Intermediate of the flanges $a$ and $c$ each carbon-holder is provided with a recess $b'$, adapted to accommodate one end of the flange $b$, located intermediate of the flanges $a$ and $c$. The shoulders produced by reducing the carbon-holders at $a^2$ and $c^2$ coact with the flanges $a$ and $c$ and prevent the bars from moving endwise, the lateral displacement of the bars from their seats being prevented by the turn-buttons $d$. The outer ends of the carbon-holders are preferably provided with enlargements $e$, serving as handles to facilitate their manipulation, and the turn-buttons $d$ are preferably formed of spring metal which is caused to flex, as shown in Fig. 11, when the button is turned to its engaging position, and thus at all times holds the bars firmly in their seats, even after the contacting surfaces have been considerably worn.

In Fig. 21 the latch $49^a$ is pivoted in the block 39 instead of on the slide, its spring $50^a$ being likewise mounted in the block and its beak $51^a$ being disposed to engage a notch in the feed-slide instead of in the block. When this arrangement is employed, a latch-lever $52^a$, separate from the latch, but arranged to coöperate therewith, is fulcrumed in the feed-slide and is provided with a finger-piece $52^b$, arranged to be operated when the front end of the slide is gripped by the operator, as heretofore described.

It is obvious that the invention is susceptible of still further modification, and I therefore wish to be distinctly understood as reserving the right to effect such changes, modifications, and variations of the illustrated structure as may come fairly within the scope of the protection prayed.

What I claim is—

1. In a type-writing machine, as a means for producing manifold-records, the combination with a platen, of a plurality of paper sheets and an interposed floating transfer element retained at one edge only and disposed opposite the writing-surface of the platen, and means for holding the transfer element stationary in its normal operative position during the independent advance of the paper.

2. In a type-writing machine, as a means for producing manifold-records, the combination with a platen, of a plurality of paper sheets disposed thereover, a holder disposed parallel to the lines of writing, and a floating carbon interposed between the paper sheets and extended in the direction of the feed thereof from the holder and held stationary by said holder during the independent advance of the paper.

3. In a type-writing machine, as a means for producing manifold-records, the combination with a platen, of a plurality of paper sheets extended thereover, a carbon-holding bar extended between the sheets and supported at one end only, and a floating transfer element interposed between the paper sheets and extended in the direction of the feed thereof from the holding-bar.

4. In a type-writing machine, as a means for producing manifold-records, the combination with a platen, of a holding-bar supported at one end only and extended parallel to the lines of writing, a pair of paper sheets between which the bar is interposed, and a floating transfer element extended in the direction of the paper-feed from the holding-bar and held stationary by the latter during the feeding of the paper.

5. In a type-writing machine, as a means for producing manifold-records, the combination with a platen, of a plurality of paper sheets disposed thereover, a plurality of oppositely-extending holding-bars interposed between the paper sheets, and floating transfer elements alternating with the paper sheets and extended in the direction of the feed thereof from the holding-bars.

6. In a type-writing machine, the combination with a platen, of a paper-guide associated therewith, and a carbon-holder carried by the guide.

7. In a type-writing machine, the combination with a platen, of a paper-guide associated therewith, and a plurality of oppositely-extending carbon-holding devices carried by the guide for disposal within opposite folds of a manifold sheet or strip.

8. In a type-writing machine, the combination with a platen, of a paper-guide extended from one edge thereof, and a carbon-holder detachably mounted on the guide.

9. In a type-writing machine, the combination with a platen, of a paper-guide extended from one edge thereof, and a plurality of parallel carbon-holding bars each supported at one end only by the guide, alternate bars extending in opposite directions from their supported ends.

10. In a type-writing machine, as a means for producing manifold-records, the combination with a flat platen, of a carbon-holder located in a plane below the writing-surface of the platen, and a carbon element extended loosely over the writing-surface of the platen at right angles to the lines of writing from the carbon-holder and having its opposite end unattached.

11. In a type-writing machine, the combination with a platen and a scale-bar overlying one edge thereof, of means for leading paper sheets and interposed transfer means under the scale-bar and over the writing-surface of the platen from a point below said surface.

12. In a type-writing machine, as a means for producing manifold-records, the combination with a platen and an overlying machine-supporting frame, of a plurality of paper sheets and interposed transfer means led between the platen and frame and over the writing-surface of the platen, and means located below the writing-surface of the platen for holding the transfer means stationary during the feeding of the paper.

13. In a type-writing machine, as a means for producing manifold-records, the combination with a flat platen and an overlying machine-supporting frame, of means for leading a plurality of paper sheets between the frame and over the writing-surface of the platen from a point below the latter, a plurality of holding-bars located below the plane of the writing-surface of the platen, and transfer elements extended loosely from the bars in the direction of the paper-feed and interposed between the paper sheets.

14. In a type-writing machine, the combination with a flat platen and a paper-guide extended from one edge thereof, of a scale-bar overlying the same edge of the platen, and carbon-holding means carried by the guide.

15. In a type-writing machine, the combination with a platen provided with a depression at one edge thereof, of a scale-bar overlying the depression, a paper-guide, and carbon-holding means carried opposite the depression in the platen by the paper-guide.

16. In a type-writing machine, the combination with a flat platen having a depression at one edge thereof, of a scale-bar overlying the depression, a paper-guide located below the scale-bar, and a plurality of oppositely-extending carbon-holding bars carried opposite the depression in the platen by the paper-guide.

17. In a type-writing machine, the combination with a support, of a carbon-holding bar detachably carried thereby, and a locking device for rigidly attaching the bar to the support 18. In a type-writing machine, the combination with a support provided with an opening, of a carbon-holding bar having a retaining device arranged to extend through the opening in the support and to coöperate with the latter.

19. In a type-writing machine, the combination with a support provided with an opening, of a carbon-holding bar having a retaining device arranged to extend through the opening in the support and to coöperate with the latter, and a locking-cam carried by the bar and coacting with the support to secure the bar in place.

20. In a type-writing machine, as a means for producing manifold-records, the combination with a platen, of mechanism coöperating therewith to feed a plurality of paper sheets, a carbon-holder disposed transverse to the paper-feed, and a transfer element extended loosely from the carbon-holder in the direction of the paper-feed and held stationary by the holder during the feeding of the paper.

21. In a type-writer, as a means for producing manifold-records, the combination with a platen, of means for retaining a plurality of paper sheets opposite the platen, paper-feeding means located opposite that portion of the platen from which the paper is delivered, a holder located opposite that portion of the platen at which the paper is received, and a floating transfer element extended loosely from the holder and interposed between the paper sheets.

22. In a type-writer, as a means for producing manifold-records, the combination with a platen, of means for delivering a plurality of superposed paper sheets to the platen, a holder interposed between the paper sheets, a transfer element extended loosely from the holder in the direction of the paper-feed, and paper-feeding means engaging the paper sheets at a point beyond the unattached portion of the transfer element to effect the independent feed of the paper.

23. In a type-writer, as a means for producing manifold-records, the combination with a platen, of oppositely-disposed carbon-holders adapted for reception within opposite folds of a manifold sheet or strip, carbon elements located within opposite folds of the strip and extended loosely in the direction of the paper-feed from the holders, and paper-feeding means adapted to engage the paper at a point in advance of the transfer elements to effect the independent feed of the paper.

24. In a type-writing machine, the combination with a flat platen and paper-feeding means, of a platen-clamp arranged to clamp the paper on the platen and movable to release the paper when the feeding mechanism is operated.

25. In a type-writing machine, the combination with a platen and paper-feeding mechanism, of a platen-clamp movable to engage and release the paper, and means associated with the paper-feeding mechanism and controlling the operation of the clamp.

26. In a type-writing machine, the combination with a flat platen and paper-feeding means, of a platen-clamp normally clamping the paper on the platen, and mechanism for causing the automatic release of the platen-clamp to permit the feeding of the paper and the automatic reëngagement of the paper by the clamp when the paper has been fed a predetermined distance.

27. In a type-writing machine, the combination with a flat platen and paper-feeding mechanism, of a platen-clamp, and means operated by the feeding mechanism to cause the retention of the paper on the platen by the platen-clamp during the retraction of the feeding mechanism.

28. In a type-writing machine, the combination with a flat platen, of paper-feeding mechanism, a catch therefor, and a platen-clamp coöperatively related to the catch.

29. In a type-writing machine, the combination with a flat platen, of paper-feeding mechanism, a platen-clamp mounted independently of the paper-feeding mechanism to clamp the paper on the platen, and a finger-piece carried by the paper-feeding mechanism and coöperatively related to the platen-clamp.

30. In a type-writing machine, the combination with a flat platen and a normally closed platen-clamp, of paper-feeding mechanism, and means carried thereby for causing the opening and closing of the platen-clamp at the proper time.

31. In a type-writing machine, the combination with a flat platen, of a platen-clamp having a tendency to move to its closed position, stop mechanism resisting such movement, and paper-feeding mechanism coöperating with the stop mechanism to effect the release of the clamp.

32. In a type-writing machine, the combination with a flat platen, of a platen-clamp having a tendency to move to its closed position, paper-feeding mechanism including a feed-slide, and means holding the clamp open and operated by the feed-slide to release the clamp and permit the same to engage the paper.

33. In a type-writing machine, the combination with a flat platen, of a platen-clamp disposed above the platen, and a clamp-operating lever located below the platen.

34. In a type-writer, the combination with a flat platen, of a platen-clamp, an operating-lever therefor, and a finger-piece extended beyond the front end of the platen and coöperatively related to said lever.

35. In a type-writer the combination with a platen, of a paper-clamp having a tendency to move in one direction, a lever connected to the clamp, and a movable stop obstructing the movement of the lever.

36. In a type-writer, the combination with a platen, of a platen-clamp having a tendency to move in one direction, a lever connected to the clamp, a stop opposing the movement of the lever, and paper-feeding mechanism arranged to move the stop.

37. The combination with a type-writer, of a platen-clamp having a tendency to move in one direction, a pair of levers connected to the opposite ends of the clamp, and means controlling the movement of said levers.

38. In a type-writer, the combination with a platen, of a platen-clamp yieldingly retained in its closed position, means for moving the clamp to its open position, and means for holding the clamp open.

39. In a type-writer, the combination with a platen, of a platen-clamp yieldingly retained in its closed position, means for moving the clamp to its open position, and an automatically-operated device coöperating with said means to prevent the clamp from moving back to its closed position.

40. In a type-writer, the combination with a platen, of a platen-clamp yieldingly retained in its closed position, means for moving the clamp to its open position, a device coöperating with said means to prevent the closing of the clamp, and paper-feeding mechanism coöperating with said device to release the clamp at the proper time.

41. In a type-writer, the combination with a platen, paper-feeding mechanism, and a latch therefor, of a platen-clamp yieldingly retained in its closed position and arranged to be moved to its open position by the catch.

42. In a type-writer, the combination with a platen, paper-feeding mechanism, and a catch therefor, of a platen-clamp and a pair of levers connected to the clamp and arranged to be moved by the catch.

43. In a type-writer, the combination with a platen, of a platen-clamp, paper-feeding mechanism including a feed-slide, and a buffer-rod controlling the movement of the clamp in one direction and operated by the slide.

44. In a type-writer, the combination with a platen-clamp and a feed-slide, of a buffer-rod opposing the movement of the platen-clamp in one direction, and means operated by the feed-slide to move the buffer-rod for the purpose of releasing the clamp.

45. In a type-writer, the combination with a platen, of a platen-clamp having a tendency to move to its closed position, a paper-feeding slide, a catch therefor arranged to move the clamp to its open position, and a buffer-rod opposing the return of the clamp to its closed position and arranged to be operated by the feed-slide to release the clamp.

46. In a type-writer, the combination with a platen, of a platen-clamp, a pair of levers connected to the clamp, reactive means urging the clamp to its closed position, a feed-slide, means carried thereby and coöperating with the levers to move the platen-clamp in one direction, and buffer-rods coöperating with the levers and arranged to be operated by the feed-slide.

47. In a type-writing machine, the combination with a platen, of a platen-clamp disposed thereover, a pair of levers connected to the clamp and arranged under the platen, reactive mechanism for moving the clamp in one direction, means coöperating with the levers to move the clamp in the opposite direction, spring-urged buffer-rods provided with heads arranged to oppose the return of the levers under the impulse of the reactive mechanism, and a paper-feed slide arranged to move the buffer-rods against the resistance of their springs to effect the release of the levers.

48. In a type-writer, the combination with a platen, of a platen-clamp, a feed-slide provided with a feed-clamp movable to its open position upon the release of the slide, means for automatically closing the platen-clamp when the feed-slide reaches the limit of its outward movement, and means for automatically closing the feed-clamp when the feed-slide reaches the limit of its inward movement.

49. In a type-writer, the combination with a platen and a paper-feeding slide, of a platen-clamp having a normal tendency to close, and a feed-clamp having a normal tendency to open.

50. In a type-writing machine, the combination with a platen and a feed-slide, of a platen-clamp having a normal tendency to move to its closed position, a feed-clamp having a tendency to move to its open position, and means whereby the platen-clamp will be opened to permit the feeding of the paper and closed after the paper has been advanced.

51. In a type-writer, the combination with a platen, of paper-feeding mechanism movable to advance the paper and arranged for retraction independently thereof, a platen-clamp, a feed-clamp, and means for closing the feed-clamp upon the retraction of the paper-feeding mechanism.

52. In a type-writer, the combination with a platen, of a paper-feeding slide, a platen-clamp and a feed-clamp both of which are normally closed, mechanism for opening the platen-clamp to permit the feed of the paper and for closing the same when the paper has been advanced, means for opening the feed-clamp to permit the feed-slide to be retracted independently of the paper, and means for closing the feed-clamp as the slide reaches the limit of its retractile movement.

53. In a type-writer, the combination with a platen, of a paper-feeding slide, a feed-clamp and a movable finger-piece located at the same end of the slide and arranged to be engaged by the hand of the operator when the slide is grasped preparatory to feeding the paper, and a normally closed platen-clamp arranged to be opened by the operation of the finger-piece.

54. In a type-writer, the combination with a platen, of a paper-feeding slide, a feed-clamp and a movable finger-piece located at the same end of the slide and arranged to be engaged by the hand of the operator when the slide is grasped preparatory to feeding the paper, a normally closed platen-clamp arranged to be opened by the operation of the finger-piece, and means for causing the automatic closing of the platen-clamp when the feed-slide reaches the limit of its outward movement.

55. In a type-writer, the combination with a platen, of a paper-feeding slide, a feed-clamp and a movable finger-piece located at the same end of the slide and arranged to be engaged by the hand of the operator when the slide is grasped preparatory to feeding the paper, a normally closed platen-clamp arranged to be opened by the operation of the finger-piece, means for causing the automatic closing of the platen-clamp when the feed-slide reaches the limit of its outward movement, and means for causing the automatic closing of the feed-clamp when the feed-slide reaches the limit of its retractile movement.

56. In a type-writer, the combination with a platen, of a feed-slide, a feed-clamp a pair of levers mounted in the slide and connected to the opposite ends of the feed-clamp, and means coöperating with said levers to effect the operation of the feed-clamp.

57. In a type-writer, the combination with a platen, of a feed-slide, a feed-clamp, a pair of levers mounted in the slide and connected to the opposite ends of the clamp, springs coöperating with the levers to open the clamp, and fixed cams coöperating with the levers to close the clamp against the resistance of the springs.

58. In a type-writing machine, as a means facilitating the production of manifold-records, a platen and an endless transfer element adapted to be interposed between paper sheets disposed opposite the platen.

59. In a type-writing machine, as a means facilitating the production of manifold-records, a platen and an endless transfer element having its opposite sides or runs in direct apposition opposite the writing-surface of the platen.

60. In a type-writing machine, as a means facilitating the production of manifold-records, a platen, a holder disposed parallel to the lines of writing, and an endless transfer element extended in the direction of the paper-feed from the holder.

61. In a type-writing machine, as a means facilitating the production of manifold-records, a platen, a holder disposed parallel to the lines of writing, and an endless transfer element extended loosely or floating from the holder.

In testimony that I claim the foregoing as my own I have hereto affixed my signature in the presence of two witnesses.

HIRAM J. HALLE.

Witnesses:
 JOSEPH MAAS,
 G. H ENGELHARD.